(12) United States Patent
Ma et al.

(10) Patent No.: US 12,321,167 B2
(45) Date of Patent: Jun. 3, 2025

(54) MOVING TARGET POSITIONING CAPABILITY TESTING DEVICE AND TESTING METHOD FOR COAL MINE

(71) Applicant: CHINA COAL TECHNOLOGY&ENGINEERING GROUP SHENYANG ENGINEERING COMPANY, Liaoning (CN)

(72) Inventors: Long Ma, Liaoning (CN); Kun Fang, Liaoning (CN); Xu Qian, Liaoning (CN); Zhenxin Li, Liaoning (CN); Changna Guo, Liaoning (CN); Mingying Xu, Liaoning (CN); Zhifu Li, Liaoning (CN); Xiaoxu Zou, Liaoning (CN); Yan Zhang, Liaoning (CN); Dong Wang, Liaoning (CN)

(73) Assignee: CHINA COAL TECHNOLOGY & ENGINEERING GROUP SHENYANG ENGINEERING COMPANY, Liaoning (CN)

(*) Notice: Subject to any disclaimer, the term of this patent is extended or adjusted under 35 U.S.C. 154(b) by 506 days.

(21) Appl. No.: 17/909,568

(22) PCT Filed: Feb. 24, 2022

(86) PCT No.: PCT/CN2022/077548
§ 371 (c)(1),
(2) Date: Sep. 6, 2022

(87) PCT Pub. No.: WO2023/151131
PCT Pub. Date: Aug. 17, 2023

(65) Prior Publication Data
US 2023/0259121 A1    Aug. 17, 2023

(30) Foreign Application Priority Data
Feb. 14, 2022 (CN) .......................... 202210132220.4

(51) Int. Cl.
*G05D 1/00* (2024.01)

(52) U.S. Cl.
CPC ......... *G05D 1/0022* (2013.01); *G05D 1/0223* (2013.01)

(58) Field of Classification Search
CPC .... G05D 1/0022; G05D 1/0223; G01S 17/74; G01S 17/88; G01S 7/497
See application file for complete search history.

(56) References Cited

U.S. PATENT DOCUMENTS 6,608,913 B1 *   8/2003  Hinton ................... G01C 15/00
                                                             382/104
2012/0130598 A1 * 5/2012  Hukkeri ................. G01S 17/89
                                                             356/603

FOREIGN PATENT DOCUMENTS

CN    103052153 A    4/2013
CN    106781700 A    5/2017
(Continued)

*Primary Examiner* — Ian Jen
*Assistant Examiner* — Renee LaRose
(74) *Attorney, Agent, or Firm* — Muncy, Geissler, Olds & Lowe, P.C.

(57) ABSTRACT

Provided is a moving target positioning capability testing device for a coal mine, including a timing unit, a control unit, a laser emitting unit, a laser receiving unit and a constant-speed traveling device, wherein multiple groups of clocks, laser receivers and laser emitters, as test points, are arranged; and the constant-speed traveling device is used to drive positioning identification cards fixed on a positioning vehicle to move forwards from a position outside a coverage boundary of a positioning sub-station in a constant-speed manner, count time of the clocks, and calculate a difference between a position of the positioning vehicle fixed with the positioning identification cards after moving a distance at the same time as a receiving time recorded by a moving target positioning system server and a position of the clock (Continued)

as a dynamic error evaluation value of the moving target positioning ability.

10 Claims, 3 Drawing Sheets

(56) References Cited

FOREIGN PATENT DOCUMENTS

| CN | 106996303 | A | * | 8/2017 |
|----|-----------|---|---|--------|
| CN | 108518221 | A |   | 9/2018 |
| CN | 111737391 | A |   | 10/2020 |
| CN | 112793629 | A |   | 5/2021 |

* cited by examiner

MOVING TARGET POSITIONING CAPABILITY TESTING DEVICE AND TESTING METHOD FOR COAL MINE

BACKGROUND OF THE INVENTION

1. Field of the Invention

The invention relates to the technical field of moving target positioning capability testing for a coal mine, in particular to a moving target positioning capability testing device and testing method for a coal mine.

2. The Prior Arts

Moving target positioning for a coal mine is a key technology for safety production monitoring before an accident and emergency rescue management after the accident. Moving target positioning can comprehensively track and monitor moving targets such as underground personnel and vehicles (including track cars and rubber-wheeled vehicles). Existing moving target positioning devices for coal mines mainly use detectors, microwave beacons, RFID, an infrared (IR) technology, a radio frequency (Radio Frequency, RF) technology and a positioning technology combining radio frequency electromagnetic waves with an ultrasonic for realization.

Notice of the State Administration of Work Safety and the State Administration of Coal Mine Safety on Building and Improving the "Six Major Systems" for Underground Safety Hedging in Coal Mine" (An Jian Zongmei Zong No. 146) requires construction and improvement of an underground personnel positioning system for a coal mine to give full play to the role of underground personnel positioning system in over-staff management and emergency rescue work, "Products with advanced technology, stable performance and high positioning accuracy should be selected first to ensure accurate mastering of dynamic distribution of underground personnel and the number of personnel on working faces". Therefore, the moving target positioning capability of the coal mine is a crucial factor, and it is necessary to test and evaluate the positioning accuracy of the underground moving target positioning device for the coal mine.

However, the existing testing devices and methods cannot test the moving target positioning capability of the coal mine, and cannot simulate the real coal mine environment in the testing process. It is impossible to comprehensively consider the possible influencing factors of moving target positioning for the coal mine, and thus it is impossible to accurately test the positioning capability.

SUMMARY OF THE INVENTION

In order to solve the technical problem of the existing defects in the prior art, the invention provides a moving target positioning capability testing device and testing method for a coal mine, so as to realize testing of the moving target positioning capability of the coal mine.

In order to solve the technical problem, the invention adopts the technical scheme that:

On one hand, the invention provides the moving target positioning capability testing device for the coal mine, and the device comprises a timing unit, a control unit, a laser emitting unit, a laser receiving unit and a constant-speed traveling device.

The timing unit comprises a display module, a first power supply module, a first control module, a first control interface, a clock module, a first wireless module and a first antenna.

The first power supply module is connected with a DC supply to provide power for other modules in the timing unit; the first wireless module is connected with the first antenna; the first control interface is connected with laser receivers; the first wireless module and the first control interface are both connected with the first control module; the clock module is connected with the display module.

The control unit comprises a second power supply module, a second control module, a clearing button, a start button, a USB interface, a second wireless module and a second antenna.

The second power supply module is connected with the DC power supply to provide power for other modules in the control unit; the second wireless module is connected with the second antenna; the clearing button, the start button and the USB interface are all connected with the second control module; the USB interface, the start button or the clearing button is used, the second control module controls the second wireless module to transmit a signal so as to control the clock module in the timing unit.

The constant-speed traveling device comprises a traction member, a constant-speed device, a positioning vehicle, a tail wheel, a wireless receiving controller and a remote controller; one end of the traction member is wound on the constant-speed device, and another end thereof is wound on the tail wheel; an identification card bracket is arranged on the positioning vehicle for allowing positioning identification cards to be placed thereon; and the wireless receiving controller is used for receiving a control instruction of the remote controller, controlling rotation of the constant-speed device, and then controlling the positioning vehicle to travel on the traction member.

Preferably, the first power supply module converts an external 12V DC power supply into a 5V DC power supply; the first control interface receives signals from the laser receivers, and controls the clock module through the first control module; the first wireless module receives signals from the control unit, and controls the clock module through the first control module.

The first control module controls the clock module according to signals of the first wireless module and the first control interface, and provides clock timing, clearing and stopping signals.

Preferably, the clock module comprises a plurality of clocks, and controls the display module to display time state according to signals of the first control module, and in case of no control signal, the display module freely displays the time.

Preferably, the display module adopts a 6-digit 4-inch high-definition LED display, a maximum value to display is 999999S, and a minimum value to display is 0.01S.

Preferably, the laser receiving unit comprises the laser receivers, a signal output interface and a power supply, wherein laser emitted by the laser emitting unit is calibrated through an optical lens, is received by the laser receivers and generates a current corresponding to a light intensity, and the current is amplified by an internal amplifier and outputs.

Preferably, the laser emitting unit comprises laser emitters, an optical lens and a power supply; and the laser emitters emit red laser through the optical lens, and a controllable distance is 15 meters.

Preferably, the constant-speed device comprises a motor, a base, a reduction box and a braking device; the motor, the reduction box and the braking device are mounted on the base, the motor is connected with the reduction box, the reduction box is connected with the braking device, the braking device is mounted on the traction member, and the traction member is wound on a runner of the reduction box; the positioning vehicle comprises a vehicle frame and a movable wheel set mounted at a bottom of the vehicle frame; the identification card bracket comprises a bracket and an epoxy strip; and the epoxy strip is fixed on the bracket, and the bracket is fixed on the vehicle frame of the positioning vehicle.

Preferably, the wireless receiving controller comprises a motor controller, a rotation speed controller and a wireless receiver, wherein the motor controller is connected with the rotation speed controller, the wireless receiver is connected with the rotation speed controller, the rotation speed controller is connected with the motor, and the motor controller is used to control the motor to start or stop; the rotation speed controller is used to control a rotation speed of the motor; and the wireless receiver is used to receive control instructions of the remote controller.

On the other hand, the invention further provides a moving target positioning capability testing method for a coal mine, and the method comprises the following steps:

Step 1: multiple groups of clocks, the laser receivers and the laser emitters, as test points, are arranged near a positioning sub-station, at two boundaries of a sub-station positioning area, and at positions between the positioning sub-station and the two boundaries of the sub-station positioning area, the control unit and a moving target positioning system server are arranged near the positioning sub-station, and the positioning identification cards to be tested, which are not less than a concurrent identification number M, are fixed on an epoxy strip, the epoxy strip is fixed on the bracket, and the bracket is fixed on the positioning vehicle, wherein the positioning identification cards shall be free from blocking and not have potential safety hazard.

The moving target positioning system server records a card number of the positioning identification cards, a receiving time, the distance, a number of receiving positioning data of each positioning identification card and a total number of the positioning identification cards, and sends instructions to the control unit through the USB interface.

Step 2: before a test, the moving target positioning system server clears data of the positioning identification cards, and sends a clearing signal to the timing unit through the control unit connected with a USB interface of the moving target positioning system server, and after receiving the clearing signal, the first control module in the timing unit controls the multiple groups of the clocks in the clock module to be cleared.

Step 3: when the test starts, the remote controller is used to control the constant-speed device to drive the positioning vehicle by the traction member to move forward at a constant speed from a position outside a coverage boundary of the positioning sub-station, the control unit controls the timing unit to start timing, count time of all clocks, and calculate a difference between a position of the positioning vehicle fixed with the positioning identification cards after moving a distance at the same time as a receiving time recorded by the moving target positioning system server and a position of the clock.

The positioning vehicle fixed with the positioning identification cards moves forward at a constant speed from the position outside the coverage boundary of the positioning sub-station, and software of the moving target positioning system server starts to receive the data of the positioning identification cards, in the meantime, the control unit connected with the USB interface of the moving target positioning system server sends a timing signal to the first control module of the timing unit, and the first control module controls the clocks to start timing; every time the positioning vehicle passes through one test point, the laser receiver sends a current signal to the timing unit, and the first control module of the timing unit controls the clock to stop timing; after the positioning vehicle drives out the coverage boundary of the positioning sub-station, the control unit counts the time of all the clocks, and calculate the difference between the position of the positioning vehicle with the fixed positioning identification cards after moving the distance at the same time as the receiving time recorded by the moving target positioning system server and the position of the clock.

Step 4: the test is performed many times, and a maximum difference among the differences between the position of the positioning vehicle fixed with the positioning identification cards and the position of the clock obtained from the many tests is taken as a dynamic error evaluation value of the moving target positioning capability, and according to the dynamic error evaluation value, the moving target positioning capability of the positioning sub-station and the positioning identification cards is evaluated under a condition that the concurrent identification number is M.

The moving target positioning capability testing device and testing method for the coal mine provided by the invention, adopting the following technical scheme, have the beneficial effects that through the laser emitters, the laser receivers, the timing unit and the constant-speed traveling device, the moving target positioning capability of the coal mine can be accurately and automatically tested, and the testing precision is high.

Figure 1:
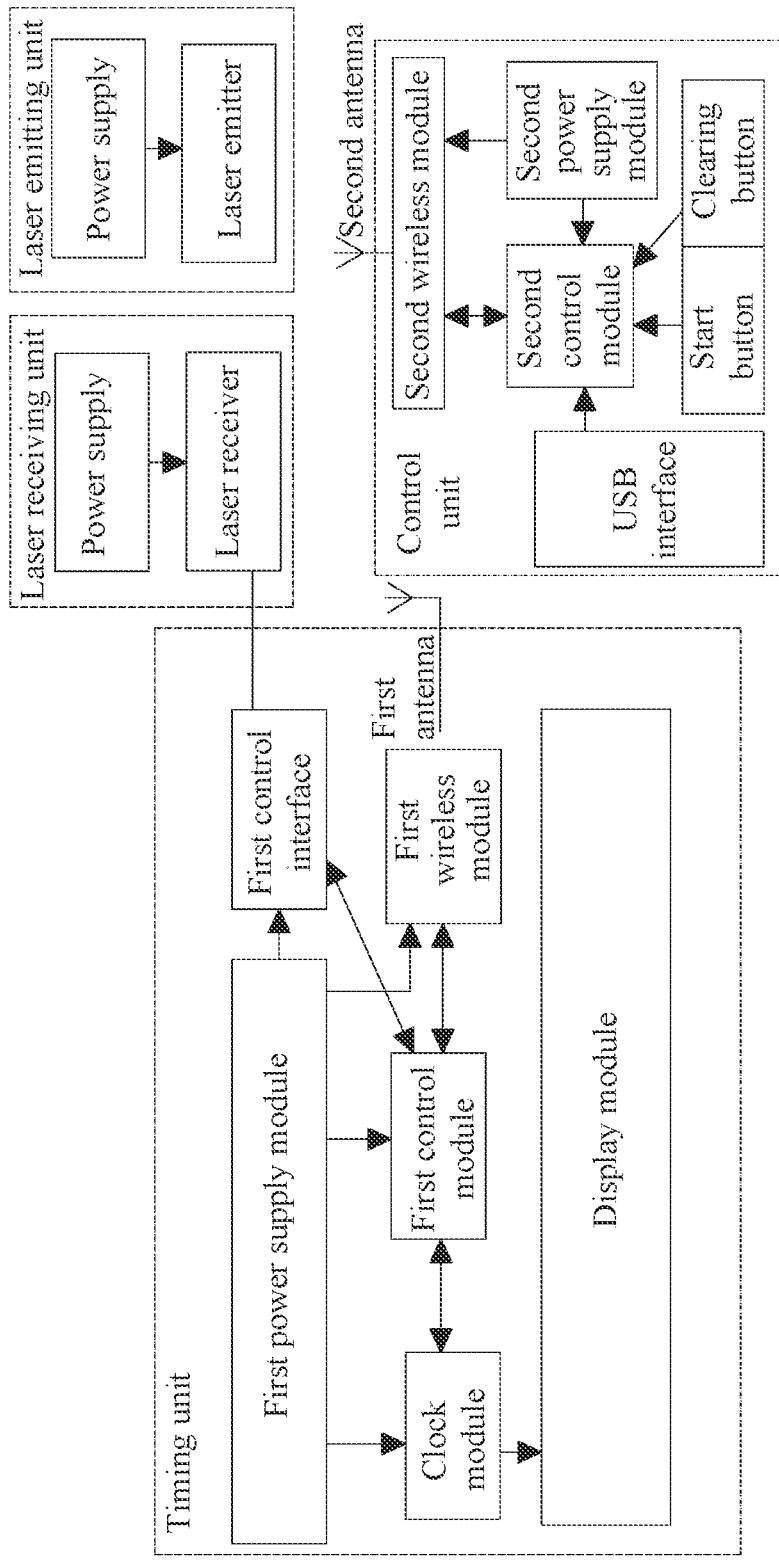
FIG. 1 is a structural block diagram of a moving target positioning capability testing device for a coal mine according to an embodiment of the invention.

In the drawings, 1: traction member; 2: positioning vehicle; 3: constant-speed device; 4: identification card bracket; 5: wireless receiving controller; 6: tail wheel; 7. reduction box; and 8: motor.

DETAILED DESCRIPTION OF THE PREFERRED EMBODIMENT

The specific embodiments of the invention will be described in further detail below with reference to the accompanying drawings and embodiments. The following examples are intended to illustrate the invention, but not to limit the scope of the invention.

In the embodiment, a moving target positioning capability testing device for a coal mine, as shown in FIG. 1, comprises a timing unit, a control unit, a laser emitting unit, a laser receiving unit and a constant-speed traveling device.

The timing unit comprises a display module, a first power supply module, a first control module, a first control interface, a clock module, a first wireless module and a first antenna.

The first power supply module is connected with a DC supply to provide power for other modules in the timing unit; the first wireless module is connected with the first antenna; the first control interface is connected with laser receivers; the first wireless module and the first control interface are both connected with the first control module; the clock module is connected with the display module.

The first power supply module converts an external 12V DC power supply into a 5V DC power supply. In the embodiments, the power supply module adopts a linear stabilized voltage power supply, and has the advantages of protection for overcurrent, overvoltage and overheat, low output impedance, low noise and the like.

The first control interface receives signals from the laser receivers, and controls the clock module through the first control module; in the embodiment, the first control interface adopts a high-precision linear isolation amplifier, and has strong anti-interference capability, small delay and high data transmission rate, and isolation withstand voltage of 5 KV.

The first wireless module receives signals from the control unit, and controls the clock module through the first control module. In the embodiment, the working frequency of the wireless module is 433 MHz, an FSK modulation method is adopted, and the module has the characteristics of strong anti-interference capability, long distance, strong penetrating power, strong diffraction capability, and the like.

The first control module controls the clock module according to signals of the first wireless module and the first control interface, and provides clock timing, clearing and stopping signals. In the embodiment, the first control module adopts an STM32 microcontroller with an ARM Cortex®-M4 core, and supports USB2.0, CAN2.0, and 10/100 Ethernet.

The clock module comprises a plurality of clocks, and controls the display module to display time state according to the signal of the first control module, and in case of no control signal, the display module freely displays the time. In the embodiment, the clock module adopts a DS3231 clock chip as a timing source, the clock module has the functions of data power-off protection and data recording, the accuracy is 2 ppm, and the annual error is about 1 minute.

The display module adopts a 6-digit 4-inch high-definition LED display, a maximum value to display is 999999S, and a minimum value to display is 0.01S.

The control unit comprises a second power supply module, a second control module, a clearing button, a start button, a USB interface, a second wireless module and a second antenna.

The second power supply module is connected with the DC power supply to provide power for other modules in the control unit; the second wireless module is connected with the second antenna; the clearing button, the start button and the USB interface are all connected with the second control module.

The USB interface, the start button or the clearing button is used, the second control module controls the second wireless module to transmit a signal so as to control the clock module in the timing unit. In the embodiment, the second control module also adopts an STM32 microcontroller with an ARM Cortex®-M4 core, and supports USB2.0, CAN2.0, and 10/100 Ethernet.

The laser receiving unit includes laser receivers, a signal output interface and a power supply.

The laser emitted by the laser emitting unit is calibrated through an optical lens, is received by the laser receivers and generates a current corresponding to a light intensity, and the current is amplified by an internal amplifier and outputs. In the embodiment, the laser emitters adopt pulse-modulated light with a light spot of 4 mm, non-contact long-distance measurement can be realized, and the laser emitters have high speed, high precision, large range, and strong resistance to light and electrical interference.

The laser emitting unit comprises laser emitters, an optical lens and a power supply; and the laser emitters emit red laser through the optical lens, and a controllable distance is 15 meters.

Figure 2:
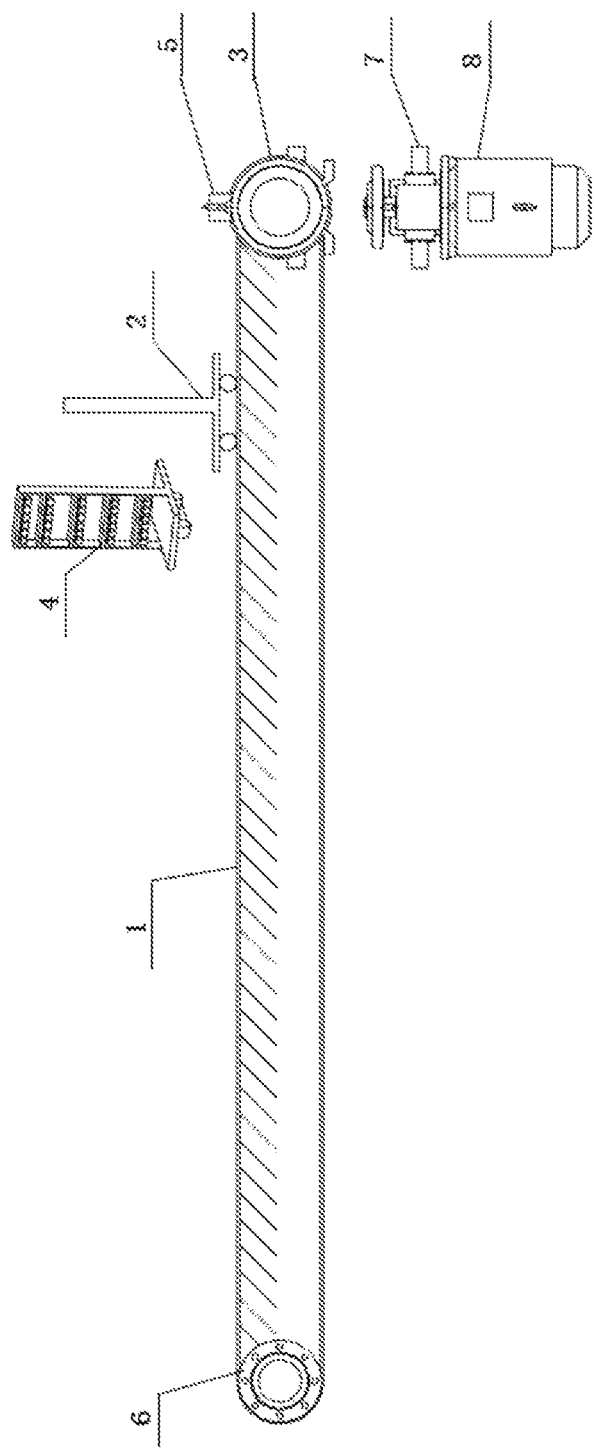
FIG. 2 is a schematic structural diagram of a constant-speed traveling device according to by the embodiment of the invention.

The constant-speed traveling device, as shown in FIG. 2, comprises a traction member 1, a positioning vehicle 2, a constant-speed device 3, a tail wheel 6, a wireless receiving controller 5 and a remote controller. One end of the traction member 1 is wound on the constant-speed device 3, and another end thereof is wound on the tail wheel 6; an identification card bracket 4 is arranged on the positioning vehicle 2 for placing positioning identification cards thereon; and the wireless receiving controller 5 is used for receiving a control instruction of the remote controller, controlling the rotation of the constant-speed device 3, and then controlling the positioning vehicle 2 to travel on the traction member 1.

In the embodiments, the traction member 1 adopts a steel wire rope, the constant-speed device 3 comprises a motor 8, a base, a reduction box 7 and a braking device. The motor 8, the reduction box 7 and the braking device are mounted on the base, the motor 8 is connected with the reduction box 7, and the reduction box 7 is connected with the braking device. The positioning vehicle 2 comprises a vehicle frame and a movable wheel set mounted at a bottom of the vehicle frame. The identification card bracket 4 comprises a fixed bracket and an epoxy strip. The wireless receiving controller 5 comprises a motor controller, a rotation speed controller and a wireless receiver. The motor controller is connected with the rotation speed controller, the wireless receiver is connected with the rotation speed controller, the rotation speed controller is connected with the motor 8, and the motor controller is used to control the motor 8 to start or stop. The rotation speed controller is used to control the rotation speed of the motor 8; and the wireless receiver is used to receive control instructions of the remote controller. The remote controller comprises a battery, a keyboard, an LCD display screen and an emitter.

In the embodiments, the motor 8 adopts a variable frequency motor with a power of 30 KW and a voltage of 380V, and with high reliability, fast start-stop and reverse response, high speed precision and large torque. The reduction box 7 adopts gear reduction, has a small size, large transmission torque, small return clearance and high precision, and can run in both forward and reverse directions. A steel wire rope is wound on the runner of the reduction box 7. The braking device adopts a caliper disc brake, and has good braking stability and strong resistance to thermal recession.

In the embodiments, the movable wheel set comprises four 8-inch rubber solid wheels. The tail wheel 6 is mounted at the end of the traction member 1 formed by the steel wire rope, and is fixed with bolts of 10 mm, and the steel wire rope is wound for no less than three circles.

In the embodiments, the rotation speed controller adopts a high-voltage IGBT module and adopts multiple PWM control. Waveform of output voltage is similar to a sine wave, and a high voltage is directly output without an output transformer; the working frequency of the wireless receivers is 450 MHz, an FSK modulation method is adopted, and the receivers have strong anti-interference capability, long distance, strong penetrating power and strong diffraction capability; and the motor controller adopts two hydraulic pumps to control the braking device, so that the motor can be started or stopped immediately. The working frequency of the remote controller is 450 MHz, the display screen shows the movement direction and speed of the motor 8, and the keyboard is used to control the movement direction and speed of the positioning vehicle 2.

Figure 3:
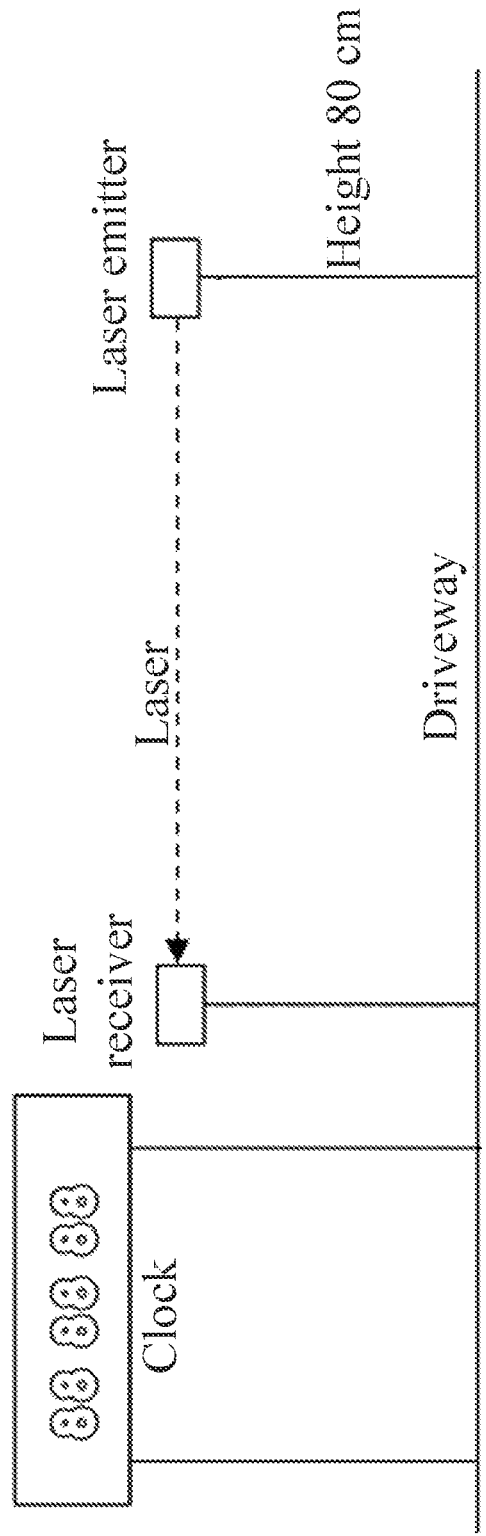
FIG. 3 is a schematic diagram of the arrangement of clocks, laser receivers, and laser emitters according to the embodiment of the invention.

In the embodiments, the moving target positioning capability testing method for the coal mine comprises the following steps:

Step 1: multiple groups of clocks, the laser receivers and the laser emitters, as test points, are arranged near a positioning sub-station, at two boundaries of a sub-station positioning area, and at positions between the positioning sub-station and the two boundaries of the sub-station positioning area, as shown in FIG. 3, the control unit and a moving target positioning system server are arranged near the positioning sub-station, and the positioning identification cards to be tested, which are not less than concurrent identification number M, are fixed on an epoxy strip, the epoxy strip is fixed on the bracket, and the identification card bracket is fixed on the positioning vehicle, wherein the positioning identification cards shall be free from blocking and not have potential safety hazard.

The moving target positioning system server can record the card number of the positioning identification cards, receiving time, distance, number of receiving the positioning data of each positioning identification card and the total number of the positioning identification cards, and can send instructions to the control unit through the USB interface.

Step 2: before a test, the moving target positioning system server clears data of the positioning identification cards, and sends a clearing signal to the timing unit through the control unit connected with a USB interface of the moving target positioning system server, and after receiving the clearing signal, the first control module in the timing unit controls the multiple groups of the clocks in the clock module to be cleared.

Step 3: when the test starts, the remote controller is used to control the constant-speed device to drive the positioning vehicle by the traction member 1 to move forward at a constant speed from a position outside a coverage boundary of the positioning sub-station, the control unit controls the timing unit to start timing, count time of all clocks, and calculate a difference between a position of the positioning vehicle fixed with the positioning identification cards after moving a distance at the same time as a receiving time recorded by the moving target positioning system server and a position of the clock.

The positioning vehicle fixed with the positioning identification cards moves forward at a constant speed from the position outside the coverage boundary of the positioning sub-station, and software of the moving target positioning system server starts to receive the data of the positioning identification cards, in the meantime, the control unit connected with the USB interface of the moving target positioning system server sends a timing signal to the first control module of the timing unit, and the first control module controls the clocks to start timing; every time the positioning vehicle passes through one test point, the laser receiver sends a current signal to the timing unit, and the first control module of the timing unit controls the clock to stop timing; after the positioning vehicle drives out the coverage boundary of the positioning sub-station, the control unit counts the time of all the clocks, and calculate the difference between the position of the positioning vehicle with the fixed positioning identification cards after moving the distance at the same time as the receiving time recorded by the moving target positioning system server and the position of the clock.

Step 4: the test is performed many times, and a maximum difference among the differences between the position of the positioning vehicle fixed with the positioning identification cards and the position of the clock obtained from the many tests is taken as a dynamic error evaluation value of the moving target positioning capability, according to the dynamic error evaluation value, the moving target positioning capability of the positioning substation and the positioning identification cards is evaluated under a condition that the concurrent identification number is M, the smaller the dynamic error evaluation value is, the stronger the moving target positioning capability of the positioning substation and the positioning identification cards is.

Finally, it should be noted that: the embodiments are only used to illustrate, but not limit the technical schemes of the invention; although the invention has been described in detail with reference to the embodiments, those of ordinary skilled in the art should understand: it can still made modifications on the technical schemes described in the embodiments, or some or all of the technical features thereof are equivalently replaced; and these modifications or replacements do not make the essence of the corresponding technical schemes depart from the scope defined by the claims of the invention.

What is claimed is:

1. A moving target positioning capability testing device for a coal mine, comprising
   a timing unit, a control unit, a laser emitting unit, a laser receiving unit and a constant-speed traveling device,
   wherein the timing unit comprises a display module, a first power supply module, a first control module, a first control interface, a clock module, a first wireless module and a first antenna;
   wherein the first power supply module is connected with a DC supply to provide power for other modules in the timing unit; the first wireless module is connected with the first antenna; the first control interface is connected with laser receivers; the first wireless module and the first control interface are both connected with the first control module; the clock module is connected with the display module;
   wherein the control unit comprises a second power supply module, a second control module, a clearing button, a start button, a USB interface, a second wireless module and a second antenna;
   wherein the second power supply module is connected with the DC power supply to provide power for other modules in the control unit; the second wireless module is connected with the second antenna; the clearing button, the start button and the USB interface are all connected with the second control module; the USB interface, the start button or the clearing button is used, the second control module controls the second wireless module to transmit a signal so as to control the clock module in the timing unit;
   wherein the constant-speed traveling device comprises a traction member, a constant-speed device, a positioning vehicle, a tail wheel, a wireless receiving controller and a remote controller; one end of the traction member is wound on the constant-speed device, and another end thereof is wound on the tail wheel; an identification card bracket is arranged on the positioning vehicle for placing positioning identification cards thereon; and the wireless receiving controller is used for receiving a control instruction of the remote controller, controlling rotation of the constant-speed device, and then controlling the positioning vehicle to travel on the traction member.

2. The moving target positioning capability testing device according to claim 1, wherein the first power supply module converts an external 12V DC power supply into a 5V DC power supply; the first control interface receives signals from the laser receivers, and controls the clock module through the first control module; the first wireless module receives signals from the control unit, and controls the clock module through the first control module; and wherein the first control module controls the clock module according to signals of the first wireless module and the first control interface, and provides clock timing, clearing and stopping signals.

3. The moving target positioning capability testing device according to claim 1, wherein the clock module comprises a plurality of clocks, and controls the display module to display time state according to a signal of the first control module, and in case of no control signal, the display module freely displays the time.

4. The moving target positioning capability testing device according to claim 1, wherein the display module adopts a 6-digit 4-inch high-definition LED display, a maximum value to display is 999999S, and a minimum value to display is 0.01S.

5. The moving target positioning capability testing device according to claim 1, wherein the laser receiving unit comprises the laser receivers, a signal output interface and a power supply, wherein laser emitted by the laser emitting unit is calibrated through an optical lens, is received by the laser receivers, and generates a current corresponding to a light intensity, and the current is amplified by an internal amplifier and outputs.

6. The moving target positioning capability testing device according to claim 1, wherein the laser emitting unit comprises laser emitters, an optical lens and a power supply; and the laser emitters emit red laser through the optical lens, and a controllable distance is 15 meters.

7. The moving target positioning capability testing device according to claim 1, wherein the constant-speed device comprises a motor, a base, a reduction box and a braking device; the motor, the reduction box and the braking device are mounted on the base, the motor is connected with the reduction box, the reduction box is connected with the braking device, the braking device is mounted on the traction member, and the traction member is wound on a runner of the reduction box; the positioning vehicle comprises a vehicle frame and a movable wheel set mounted at a bottom of the vehicle frame; the identification card bracket comprises a bracket and an epoxy strip; and the epoxy strip is fixed on the bracket, and the bracket is fixed on the vehicle frame of the positioning vehicle.

8. The moving target positioning capability testing device according to claim 7, wherein the wireless receiving controller comprises a motor controller, a rotation speed controller and a wireless receiver, wherein the motor controller is connected with the rotation speed controller, the wireless receiver is connected with the rotation speed controller, the rotation speed controller is connected with the motor, and the motor controller is used to control the motor to start or stop; the rotation speed controller is used to control a rotation speed of the motor; and the wireless receiver is used to receive control instructions of the remote controller.

9. A moving target positioning capability testing method for a coal mine, implemented based on the device according to claim 1, the method comprising the following steps:

Step 1: arranging multiple groups of clocks, the laser receivers and the laser emitters, as test points, near a positioning sub-station, at two boundaries of a sub-station positioning area, and at positions between the positioning sub-station and the two boundaries of the sub-station positioning area, arranging the control unit and a moving target positioning system server near the positioning sub-station, and fixing the positioning identification cards to be tested, which are not less than a concurrent identification number M, on the positioning vehicle, wherein the positioning identification cards shall be free from blocking and not have potential safety hazard;

Step 2: before a test, clearing data of the positioning identification cards by the moving target positioning system server, and sending a clearing signal to the timing unit through the control unit connected with a USB interface of the moving target positioning system server, and after receiving the clearing signal, the first control module in the timing unit controls the multiple groups of the clocks in the clock module to be cleared;

Step 3: when the test starts, using the remote controller to control the constant-speed device to drive the positioning vehicle by the traction member to move forward at a constant speed from a position outside a coverage boundary of the positioning sub-station, wherein the control unit controls the timing unit to start timing, count time of all clocks, and calculate a difference between a position of the positioning vehicle fixed with the positioning identification cards after moving a distance at the same time as a receiving time recorded by the moving target positioning system server and a position of the clock;

wherein the positioning vehicle fixed with the positioning identification cards moves forward at a constant speed from the position outside the coverage boundary of the positioning sub-station, and software of the moving target positioning system server starts to receive the data of the positioning identification cards, in the meantime, the control unit connected with the USB interface of the moving target positioning system server sends a timing signal to the first control module of the timing unit, and the first control module controls the clocks to start timing; every time the positioning vehicle passes through one test point, the laser receiver sends a current signal to the timing unit, and the first control module of the timing unit controls the clock to stop timing; after the positioning vehicle drives out the coverage boundary of the positioning sub-station, the control unit counts the time of all the clocks, and calculate the difference between the position of the positioning vehicle fixed with the positioning identification cards after moving the distance at the same time as the receiving time recorded by the moving target positioning system server and the position of the clock; and Step 4: performing the test many times, taking a maximum difference among the differences between the position of the positioning vehicle fixed with the positioning identification cards and the position of the clock obtained from the many tests as a dynamic error evaluation value of the moving target positioning capability, and according to the dynamic error evaluation value, evaluating the moving target positioning capability of the positioning sub-station and the positioning identification cards under a condition that the concurrent identification number is M.

10. The method according to claim 9, wherein the moving target positioning system server records a card number of the positioning identification cards, the receiving time, the distance, a number of receiving positioning data of each positioning identification card and a total number of the positioning identification cards, and sends instructions to the control unit through the USB interface.

* * * * *